UNITED STATES PATENT OFFICE.

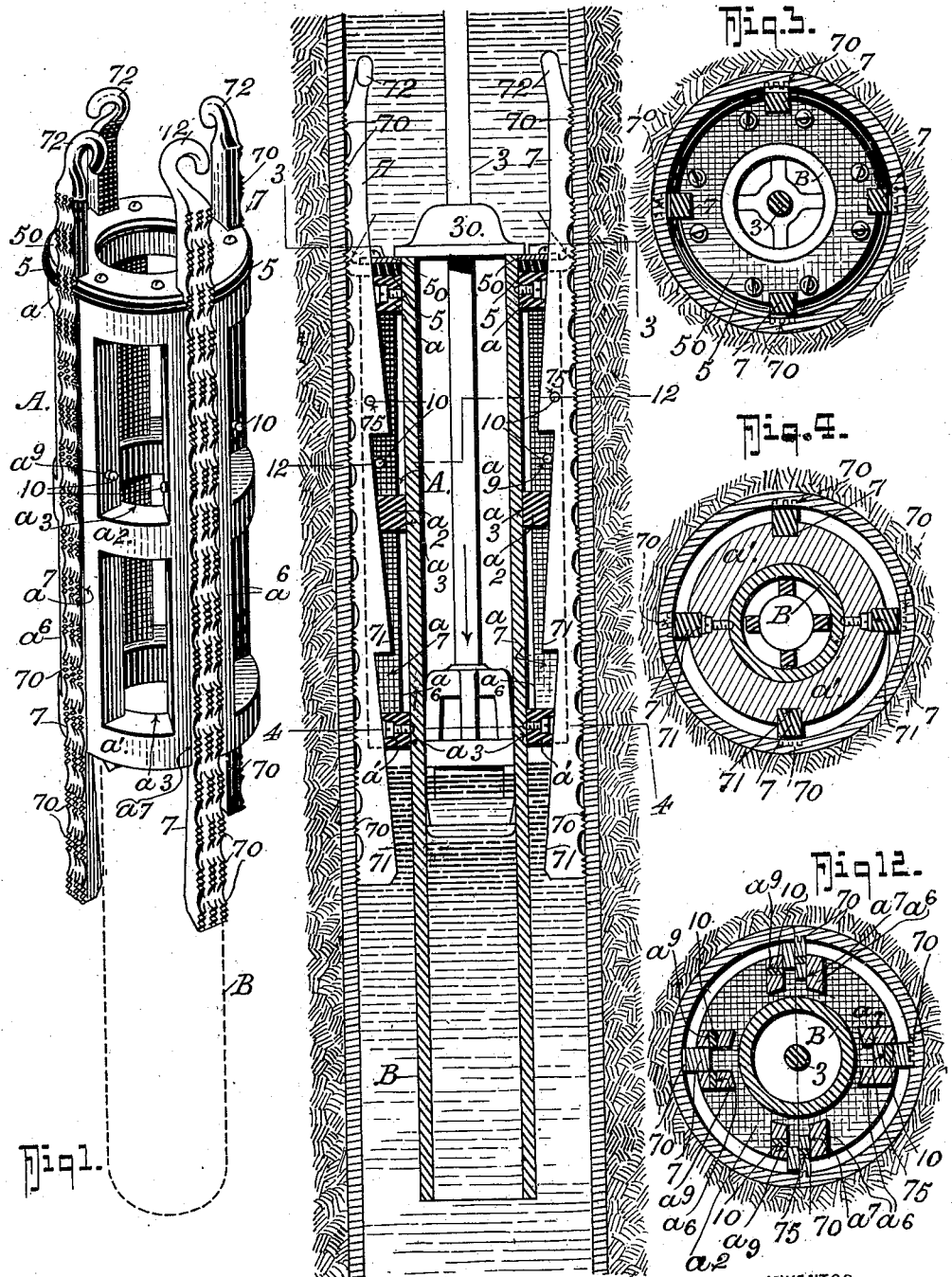

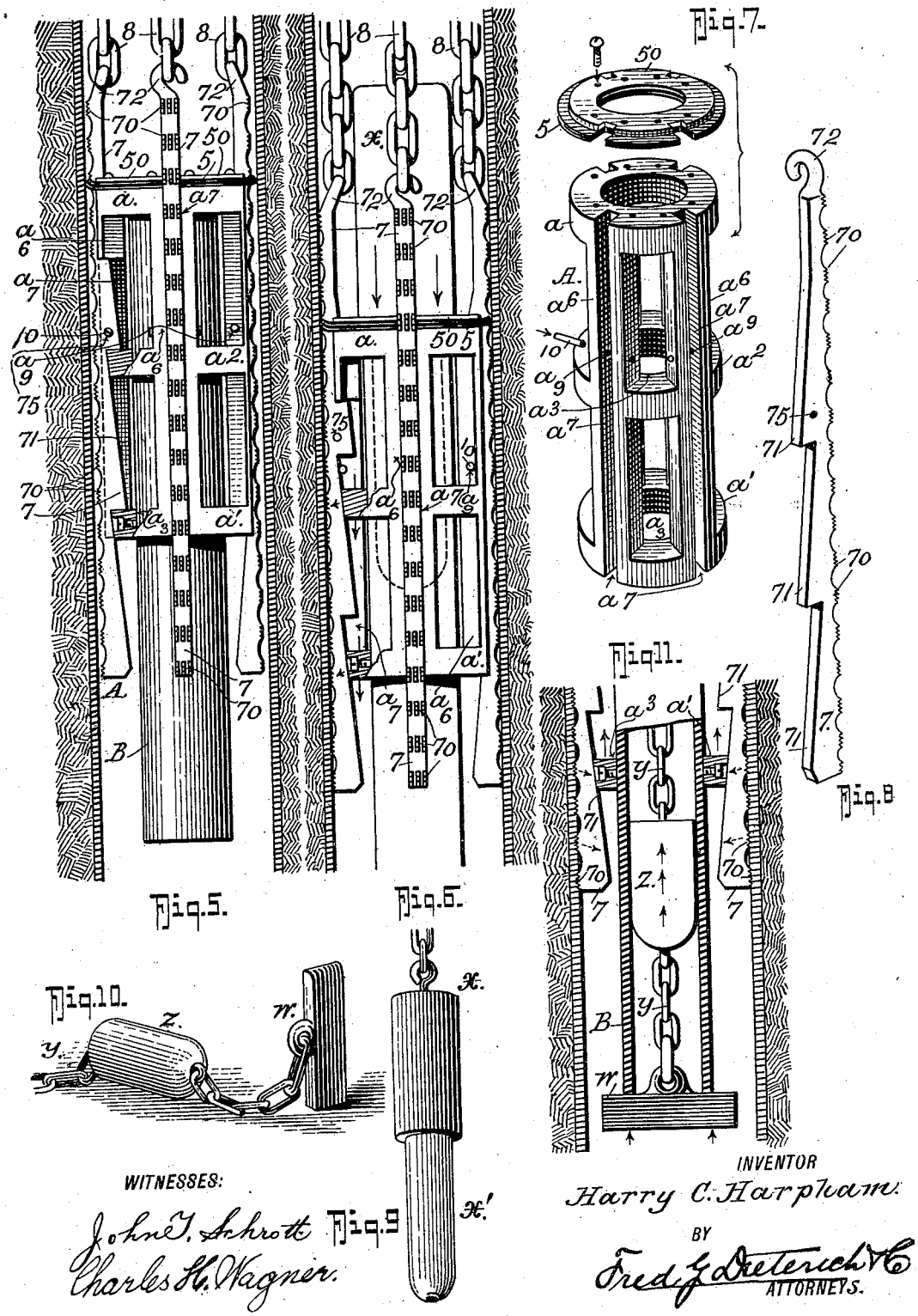

HARRY C. HARPHAM, OF SAN ANTONIO, TEXAS.

CAGE OR SUPPORT FOR WELL-TUBING.

982,057.  Specification of Letters Patent.  Patented Jan. 17, 1911.

Application filed April 30, 1910. Serial No. 558,624.

*To all whom it may concern:*

Be it known that I, HARRY C. HARPHAM, residing at San Antonio, in the county of Bexar and State of Texas, have invented a new and Improved Cage or Support for Well-Tubing, of which the following is a specification.

This invention, while relating generally to means slidable into and adapted to interlock with a well casing for supporting the well tubing at any desired depth within said casing, more particularly has for its object to provide an improved and simplified means for sustaining the tubing in deep or shallow wells and in such manner that the second or delivery pipe, usually employed is done away with.

My invention, in its generic sense, comprises a cage or supporting member, adjustable locking devices carried therein and adapted, under hammer action on the cage to be brought into tight frictional engagement with the casing and in which the cage also forms a closure plug to divide the casing into an upper and a lower portion that are joined by the tubing sustained by the cage.

In its more complete nature, my invention comprises an improved construction of cage having means for being positively moved into a gripping engagement with the well casing and in which the several parts are co-operatively combined so the cage may be readily and economically made, easily kept in repair, can be quickly withdrawn from the casing, positioned at different points therein, and will be reliable and efficient for its intended purposes.

In its still more complete nature my invention consists in certain details of construction and peculiar combination of parts, all of which will be hereinafter fully explained, specifically pointed out in the appended claims and illustrated in the accompanying drawings, in which:—

Figure 1, is a perspective view of the cage or supporting member, the tube being indicated in dotted lines. Fig. 2, is a vertical section of the same with the tube and a portion of the well casing. Figs. 3 and 4 are horizontal sections of the same on the lines 3—3 and 4—4 on Fig. 2. Fig. 5, is a side elevation of the cage with the tube supported thereby, and lowered into the casing to the point where it is to be held, parts being in section. Fig. 6, is a similar view that shows the manner in which the cage is hammered or wedged in the casing. Fig. 7, is a view of the cage body. Fig. 8, shows one of the wedge lock members separated from the cage. Fig. 9, is the plunger or cage pounder. Fig. 10, is the tube extracting device. Fig. 11, illustrates how the latter is used to lift the tube. Fig. 12, is a cross section on the line 12—12 on Fig. 2.

In carrying out my invention, I provide a body or cage A consisting of an upper and lower disk portion $a$—$a'$ and if desired, it may include one or more intermediate disks $a^2$, the several disks being centrally apertured as at $a^3$ for the passage therethrough of the well tubing B as clearly shown in Fig. 2 of the drawings which also shows the plunger 3 equipped with the usual type of gravity valve devices 30.

The cage A at the upper end has a packing ring 5 of a slightly larger diameter than the cage head and which is held down by a flat ring 50. The packing is preferably of soft rubber and it, when the water comes on the top thereof is pressed tightly against the side of the casing and makes a fluid tight joint between the cage and the casing that divides the casing, as it were, into an upper and a lower chamber, joined by the tubing B.

The several horizontal portions of the cage are connected and braced by a number of vertical members $a^6$, each of which is radially grooved with respect to the tubing, its full length to form guide grooves $a^7$ in each of which plays a wedge shaped gripper or locking member 7, the outer face of each of which is serrated or hooked as at 70 and the inner edge of which has one or more wedge portions 71—71, one for each disk portion of the cage, the purpose of which will presently appear.

The upper end of each of the members 7 terminates in a hook 72 to receive the cables or chain supports 8—8 for raising and lowering the cage in the casing and each of the guide members $a^6$ of the cage is transversely apertured as at $a^9$ to receive a link pin 10, preferably soft metal, that also passes through apertures 75 in the wedge members 7 when the said members and cage are joined for being simultaneously lowered into the casing.

By reason of the peculiar arrangement of the several parts as stated and shown, it will be understood that when the cage is lowered with the tubing B to the point desired, see Fig. 5, by hammering down the cage the pins that hold the wedge members or dogs to the cage will be sheared off and the cage as it is driven against the radially movable wedge members force the said members into tight frictional engagement with the cage and the casing and thus hold the cage and the tube in the operative position.

Any suitable means may be used for hammering or driving the cage, for example, a device like that shown in Fig. 9 which comprises the driving head $x$ and a pendent guide $x'$ for riding in the tube.

For pulling out the tube B I use the devices shown in Fig. 10 and which comprise a lift chain $y$ movable through a plug guide $z$ that fits in the tube and a cross bar $w$ that slips endwise through the tube and when passed through assumes a crosswise position, it being obvious that a few hard jerks on the pulling device will loosen the cage from the wedge members and put it in condition for being easily removed with the wedge members from the casing.

The cage A, in practice, is made in different sizes and each size will fit three or more different sized casings and this latter advantage is apparent from the following: A six-inch diameter cage can be used in a six and one-quarter, six and three-eighths, six and one-half and other sizes up to six and three-fourth inches casing, this being made possible by having the packing ring on the head of the cage of an appropriate diameter.

Having thus described my invention, what I claim and desire to secure by Letters Patent, is:

1. In a well, a mechanism insertible into the well to divide the same into two parts, said mechanism including a supporting cage, a means for locking said cage in position in said well, a pipe section carried by said cage, and a valved pump piston removably held in said pipe section to coöperate with said pipe section and serve as a pump, a piston rod projected upwardly from said piston and above said cage and a cap on said rod to rest on said pipe section and form a closure for the upper end of the same.

2. In a well, a mechanism insertible in the well to divide the same into two parts, said mechanism including a supporting cage and a valved tube supported thereby, means for locking said cage in position in said well, and breakable connections for joining said cage and said locking means to cause the two to lower together into the well casing.

3. A pump tube supporting means for wells, comprising in combination with the casing, a pump piston and valves that coöperate therewith; a cage fixedly attached to the tube and including a head portion that forms a transverse cut-off for the well to divide it into an upper and a lower section in communication through the pump tube, a series of wedge-shaped guides suspended within the well for engaging with the side thereof, radial grooves in the pump tube carrying cage for receiving the wedge shaped guides.

4. A pump tube supporting means for wells, comprising in combination with the tube, a pump piston and valves that coöperate therewith; a cage fixedly attached to the tube and including a head portion that forms a transverse cut-off for the well to divide it into an upper and a lower section in communication through the pump tube, a series of wedge-shaped guides suspended within the well for engaging with the side thereof, radial grooves in the pump tube carrying cage for receiving the wedge shaped guides.

5. The combination with a well casing, and a series of wedge shaped guides pendently supported within the casing; of a cage having a series of vertical and radially disposed grooves having shouldered portions for engaging with the wedge shaped pendent guides, the said guides and the cage having alining apertures, breakable pins in the said alining apertures, a pump tube supported by the case and piston and valve devices coöperating with the tube, as set forth.

6. The combination with the well casing and a series of guides pendently supported from the top of the casing, each of said guides having serrated outer faces, their inner faces formed with one or more wedge shaped portions, each of the guides being apertured; of a cage having radially disposed vertical grooves for receiving and sliding on the pendent guides, each of the said grooves having portions for engaging with the wedge shaped portions of the guides, the upper end of the cage having a packing rim, the vertical grooved portions of the cage being apertured, breakable pins that pass through the said apertures and the apertures in the pendent guides, a pump tubing supported by the cage and a piston operable from the top of the well and valve devices, the said valve devices and the piston coöperating with the pump tubing.

7. A cage for supporting pump tubes in wells having radial longitudinal grooves forming guideways, guides longitudinally movable in said grooves, means for forcing said guides outwardly with respect to said cage when said guides are moved longitudinally in one direction, means for connecting said guides to said cage to prevent the longitudinal movement of said guides, means for holding said guides in a well, said guide connecting means being releasable to permit said guides to have longitudinal movement with respect to said cage and cause said guides to retain said cage in position in a well.

8. In a device of the class described, a cage having longitudinal grooves on its outer side, wedge carrying guides, held in said grooves, releasable means for connecting said guides to said cage, means for suspending said guides and cage within a well casing and holding said guides in position.

HARRY C. HARPHAM.

Witnesses:
C. SCHENERMEYER,
W. A. MOSBACH.